United States Patent [19]

Sakuragi

[11] Patent Number: 5,081,688

[45] Date of Patent: Jan. 14, 1992

[54] APPARATUS FOR RECORDING REGENERATING RECORD INFORMATION COMPRISING TITLE AND IMAGE INFORMATION

[75] Inventor: Hiroshi Sakuragi, Yokohama, Japan

[73] Assignee: Kabushiki Kaisha Toshiba, Kawasaki, Japan

[21] Appl. No.: 634,488

[22] Filed: Dec. 27, 1990

[30] Foreign Application Priority Data

Dec. 28, 1989 [JP] Japan ................... 1-344421

[51] Int. Cl.[5] .............................................. G06K 9/00
[52] U.S. Cl. ........................................... 382/11; 382/10
[58] Field of Search ....................... 382/10, 11, 14, 16, 382/40

[56] References Cited

U.S. PATENT DOCUMENTS

| | | | |
|---|---|---|---|
| 4,524,453 | 6/1985 | Egami et al. | 382/40 |
| 4,578,811 | 3/1986 | Inagaki | 382/11 |
| 4,654,718 | 3/1987 | Sueyoshi | 382/11 |
| 4,907,283 | 3/1990 | Tanaka et al. | 382/11 |

Primary Examiner—Stephen Brinich
Attorney, Agent, or Firm—Finnegan, Henderson, Farabow, Garrett, and Dunner

[57] ABSTRACT

A title paper on which title information is written is prepared and set on the top of a document to be recorded. The title information is read together with the document by a scanner and recognized by character recognition, thereby automatically generating a title. Therefore, a keyboard operation for generating a title information can be eliminated and thus a recording operation and a title preparing operation can be separated and an operator's labor can be saved.

13 Claims, 3 Drawing Sheets

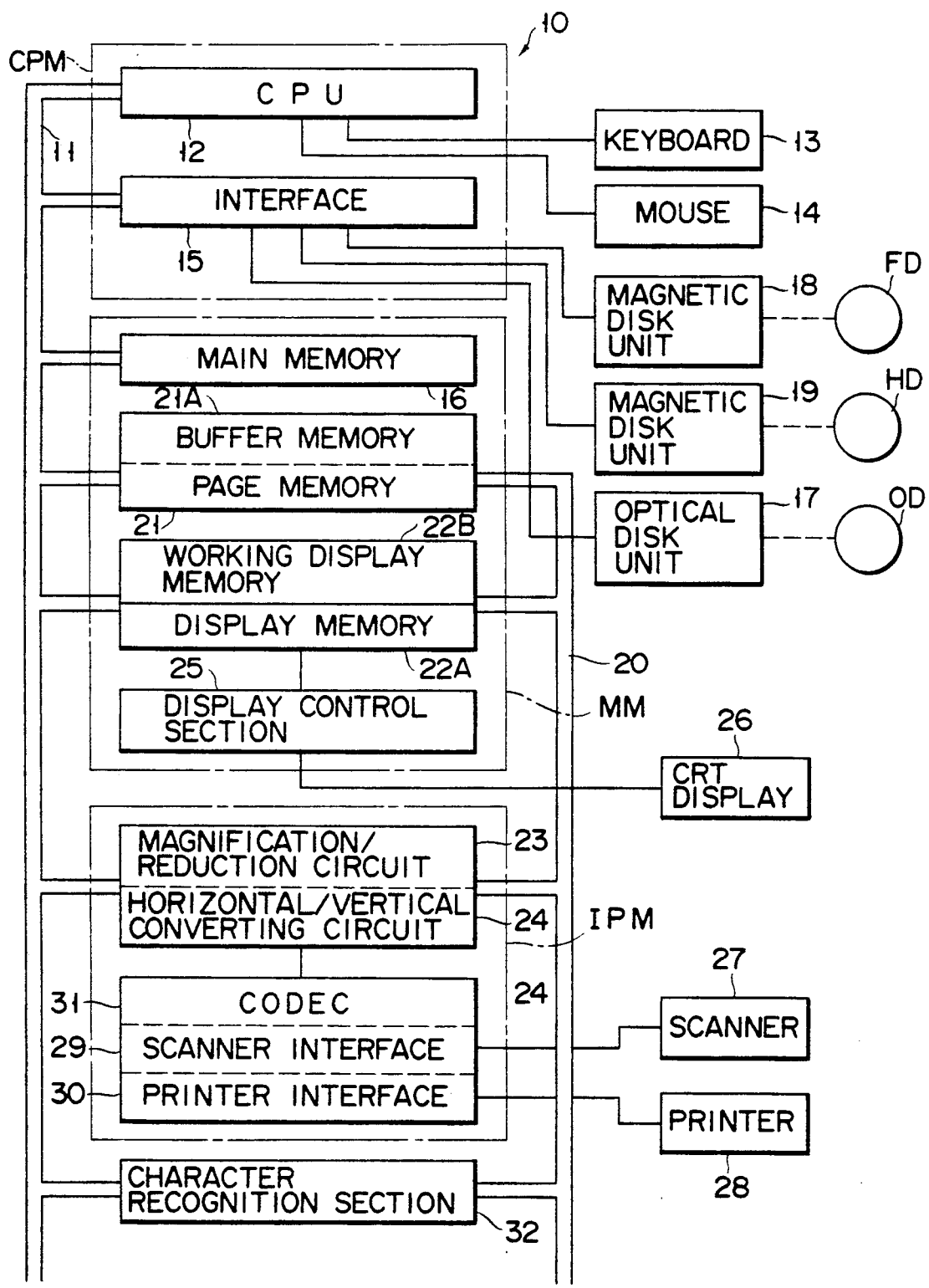
F I G. 1

NUMBER

| | KEY NAME | KEY VALUE | [CHARACTER] [8·DIGITS] [FIXED] |
|---|---|---|---|
| 1 | DOCUMENT NUMBER | ☐30810MN | |
| 2 | CLASSIFI-CATION | 6 | DATA TRANSMISSION |
| 3 | RELATED PRODUCT 1 | 1 | FILE SYSTEM |
| 4 | RELATED PRODUCT 2 | 11 | |
| 5 | DIVISION | | |
| 6 | DOCUMENT NAME | TOTAL OASYSTEM | |
| 7 | DATE OF PREPARATION | 870501 | |
| 8 | COMMENTS 1 | | |
| 9 | COMMENTS 2 | | |
| 10 | RETENTION DUE DATE | | |
| 11 | | | |
| 12 | | | |
| 13 | | | |
| 14 | | | |
| 15 | | | |
| 16 | | | |
| 17 | | | |
| 18 | | | |
| 19 | | | |
| 20 | | | |
| TOTAL PAGE | | 0/10 | |

APPARATUS FOR RECORDING REGENERATING RECORD INFORMATION COMPRISING TITLE AND IMAGE INFORMATION

BACKGROUND OF THE INVENTION

1. Field of the Invention

This invention relates to an information recording-/regenerating apparatus such as an electronic filing apparatus using an optical disk.

2. Description of the Related Art

Recently, an electronic filing apparatus using optical disks has been practically used, in which image information (original) such as a large number of documents prepared in an office or the like can be recorded (registered) and regenerated (retrieved) by optical means. In the electronic filing apparatus, a title is attached to image information, i.e., information recorded in the optical disk for every document, for example. In this case, the image information is inputted by a scanner but the title is inputted manually by a keyboard. Hence, when much image information (documents) must be registered and also a title must be attached to each document, it is quite troublesome to manually input the titles into the electronic filing apparatus by the keyboard.

To expedite the manual inputting operation, a batch title registering mode can be used in the electronic filing apparatus. In such batch title registering mode, the titles for the documents must be inputted in advance into a floppy disk by means of an external device such as a personal computer. The floppy disk is then loaded into the electronic filing apparatus, and the titles are read out from the floppy disk and attached to the image information (document) so that the title is consistent with the image information while the image information is being registered. More particularly, the manual title inputting operation by the keyboard is replaced by an automatic inputting operation by means of a floppy disk, thereby simplifying the title inputting operation.

However, a keyboard operation is still required in the batch title registering mode, as in the normal title registering mode in which image information is registered while manually inputting the title by the keyboard.

SUMMARY OF THE INVENTION

The object of the present invention is to provide an information recording/regenerating apparatus which eliminates a keyboard operation for generating title information, so that the title information inputting operation can be separated from the normal information recording operation.

To achieve the above object, the information recording/regenerating apparatus of the present invention comprises means for reading record information, means for recognizing predetermined record information of the record information as title information, and first recording means for attaching said title to the record information and recording the attached title and image information.

Further, the information recording apparatus of the present invention records information together with related retrieval information in a recording medium and comprises means for reading successively a plurality of sheets each of which includes information to be recorded; means for recognizing the information of selected sheet as the retrieval information; and means for recording the recognized retrieval information and the information of the remaining sheets into the recording medium.

According to the present invention, it is possible to generate title information automatically since the title information can be inputted by the reading means for reading an original.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block diagram schematically showing an embodiment of an information recording/regenerating apparatus according to the present invention;

FIG. 3 is a diagram showing an example of the format of the title paper shown in FIG. 2.

DETAILED DESCRIPTION OF THE PREFERRED EMBODIMENT

Figure 2:
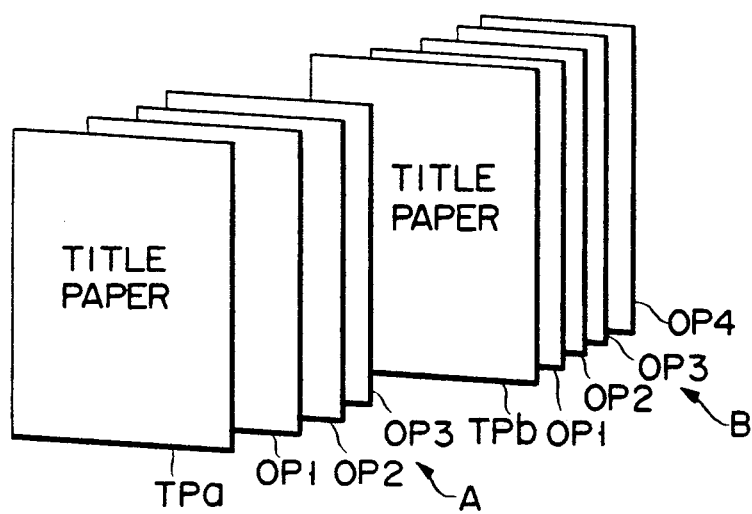
FIG. 2 is a perspective view showing the arrangement of originals (image information) and a title paper (title)

There will now be described an embodiment of the present invention with reference to the accompanying drawings.

FIG. 1 is a block diagram schematically showing an embodiment of an information recording/regenerating apparatus according to the present invention. As shown in FIG. 1, a controller 10 includes a control module CPM, a memory module MM, an image process module IPM, and a character recognition section 32, all of which are connected to a system bus 11. Further, the memory module MM, the image process module IPM, and the character recognition section 32 are connected to an image bus 20.

In the control module CPM, a CPU 12 and an interface 15 are connected to the system bus 11. The CPU 12 controls the apparatus entirely and can perform multitask operation. A keyboard 13 for inputting various information such as command information into the apparatus and a mouse 14 for serving as a pointing device are connected to the CPU 12. The mouse 14 is used to move a cursor displayed on a CRT display 26 described later. The interface 15 is connected to a optical disk unit first recording means) 17, a magnetic disk unit 18, and a magnetic disk unit (second recording means) 19. Optical disks OD are loaded in the optical disk unit 17, and image information and the like are recorded thereon. The magnetic disk unit 18 is constituted by a floppy disk unit, for example, in which floppy disks FD are loaded. The magnetic disk units 19 is constituted by a hard disk unit, for example, in which hard disks HD are loaded. The magnetic disk units 18 and 19 store retrieve information for the optical disks OD, display information necessary for retrieval operation, image editing programs, and the like.

The memory module MM is constituted by a main memory (second memory means) 16, a page memory (first memory means) 21, a buffer memory 21A, a display memory 22A, a working display memory 22B, and a display control section 25. The main memory 16 is connected to the system bus 11; the page memory 21, the buffer memory 21A, the display memory 22A, and the working display memory 22B are connected to both the system bus 11 and the image bus 20; and the display control section 25 is connected to the image memory 22A. The main memory 16 stores operating programs for the CPU 12, and the like. The CPU 12 can be operated in accordance with the operating program. The page memory 21 stores information on the originals read by the scanner (reading means) 27, information processed by a magnification/reduction circuit 23, etc. The page memory 21 has a memory capacity corresponding to several pages of A4 size, for example. The buffer memory 21A is provided as a part of the page memory 21 and stores the information read out from the optical disk 17. The display memory 22A and the working display memory 22B store information to be displayed. The display control section 25 is connected to the CRT display 26 and causes the CRT display 26 to display the information stored in the display memory 22A.

The image process module IPM includes the magnification/reduction circuit 23, a horizontal/vertical converting circuit 24, a coder/decoder circuit (CODEC) (coder decoder means) 31 including a scanner interface 29, and a printer interface 30. The magnification/reduction circuit 23 and the horizontal/vertical converting circuit 24 are both connected to the system bus 11 and the image bus 20. The coder/decoder circuit 31 is connected to the horizontal/vertical converting circuit 24; the scanner interface 29 is connected to the scanner 27; and the printer interface 30 is connected to the printer 28. The magnification/reduction circuit 23 executes magnification/reduction operation with respect to the image information supplied from the page memory 21. The horizontal/vertical converting circuit 24 executes horizontal/vertical conversion operation with respect to the image information also supplied from the page memory 21. The coder/decoder circuit 31 converts the image information supplied from the scanner 27 through the scanner interface 29 into a predetermined code, and converts a code supplied from the page memory 21 into the image information.

The scanner 27 scans and exposes an original on an original table to generate electrical signals in accordance with the image information on the original. An operating section (not shown) and an automatic original feeder (not shown) are provided in the scanner 27. Parameters such as the size of the original to be read, the density of the original, and the reading density, etc, are set in the operating section. The automatic original feeder automatically transfers the original on the original table. The printer 28 prints the image information read by the scanner 27 or read out from the optical disk unit 17.

A character recognition section (recognizing means) 32 is connected to the system bus 11 and the image bus 20. The section 32 recognizes the title information of dot images to output character code information corresponding to the title information. More particularly, the section 32 recognizes the title information written on the title paper as character recognition and automatically generates character code information (title) which will be attached to the image information (document) to be recorded.

FIG. 2 is a perspective view showing an arrangement of the original and the title paper, both are to be recorded in the optical disk 19. For example, when a first document A consisting of the original of three sheets $OP_1$ to $OP_3$ and a second document B consisting of the original of four sheets $OP_1$ to $OP_4$ are to be recorded at a time, title papers $TP_a$ and $TP_b$ on which the title information concerning the documents A and B are respectively described are prepared, and the title papers $TP_a$ and $TP_b$ are set on the top of the first and second documents A and B, respectively. Thus scanner 27 reads the title paper immediately before scanning the corresponding document.

FIG. 3 shows an example of the format of the title paper TP. The title information is written in predetermined columns on the title paper TP in accordance with a predetermined format. The title information includes, for example, document number, classification of document, related products, division to which the document belongs, document name, date of preparation, and comments.

Now, automatic title preparing and attaching operations for recording the documents in the optical disk OD will be described with reference to FIGS. 1 to 4.

Figure 4:
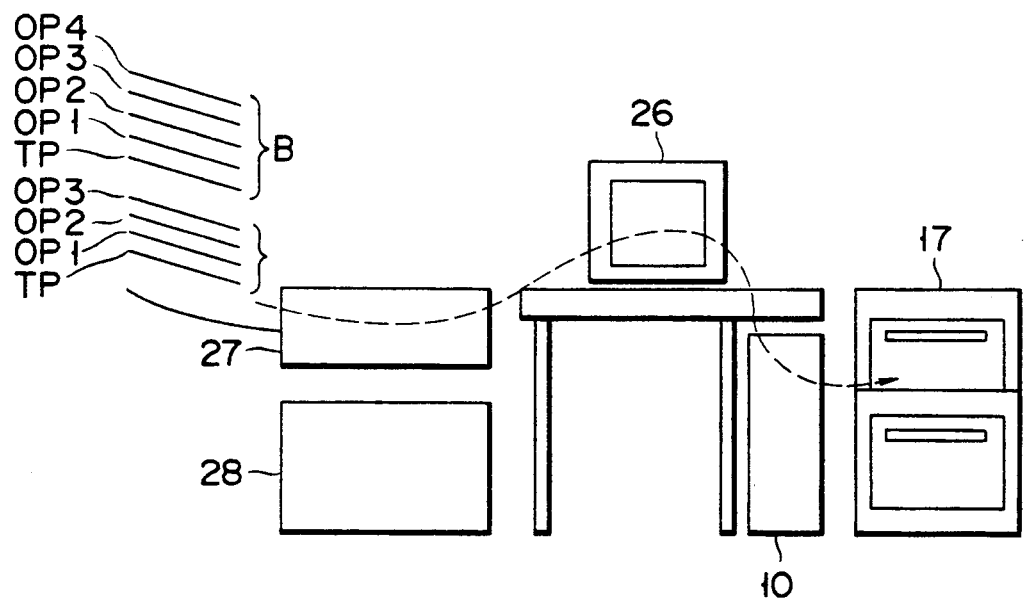
FIG. 4 is a front view showing an outer appearance of the information recording/regenerating apparatus shown in FIG. 1.

First, as shown in FIG. 2, the documents and the title papers TP are both prepared. Then, as shown in FIG. 4, the documents and the title papers TP are set in the automatic original feeder of the scanner 27. The broken line in FIG. 4 shows the flow of the image information after the information is read by the scanner 27. The scanner 27 reads the title information on the title papers TP together with the image information on the documents. The information is supplied through the scanner interface 29, the magnification/reduction circuit 23 and the image bus 20 to the page memory 21 and is stored therein. Since the items on the title paper TP are written in a predetermined fixed format, as shown in FIG. 3, each of the items can be assigned to one of the two dimensional addresses in the page memory 21. Hence, it is possible to extract only the title information from the page memory 21 and output it to the system bus 11 or the image bus 20.

The title information in the information stored in the page memory 21 is supplied through the system bus 11 to the character recognition section 32. The title information is recognized as characters and is converted into the character coded information. Since the character coded information can be processed by the CPU 12, it can be automatically attached to the image information (documents) to be recorded, as will be described later. The converted title information, i.e. the character coded information, is supplied through the display memory 22A and the display control section 25 to the CRT display 26, and is displayed thereon. The character coded information can also be supplied through the printer interface 30 to the printer 28, and is outputted therefrom. The converted title information is stored in the main memory 16. The converted title information is thereafter transmitted from the main memory 16 through the interface 15 to both the magnetic disk unit 19 and the optical disk unit 17, and is recorded in the magnetic disk HD and the optical disk OD. The magnetic disks HD operate as a data base in which many groups of the coded title information can be stored.

On the other hand, the image information in the information stored in page memory 21 is supplied through the image bus 20 and the magnification/reducing circuit 23 to the coder/decoder circuit 31. The image information is coded into predetermined codes in the coder/decoder circuit 31. The coded image information is supplied through the image bus 20 to the buffer memory 21A, and thereafter through the system bus 11 and the interface 15 to the optical disk unit 17, and is recorded in the optical disk OD. Meanwhile, the extracted title information is transmitted from the magnetic disk HD through the interface 15 to the optical disk unit 17. The title information is duplicated on the optical disk OD and attached to the corresponding image information. Thereafter, the image information can be regenerated with the title information attached.

As has been described above, the title paper and the original are inputted and read consecutively in the apparatus of the present invention, thereby automatically attaching the title to the document. More specifically, title information written on the title paper is inputted as part of the image information by the scanner, and thereafter it is are recognized as character recognition thereby generating the title. In this way, since the operator need not input the title by the keyboard during the recording operation, the keyboard operation for attaching the title to the document can be eliminated. Hence, the operator's load and labor for the recording operation can be reduced extremely. Further, it is possible to completely separate the title paper preparing operation from the recording operation.

In addition, if the title paper can be prepared by handwriting, the keyboard operation of a word processor or the like is also unnecessary. Hence, the keyboard operation for preparing the title can be fully eliminated by using the scanner which is available for handwritten characters.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

I claim:

1. An information recording/regenerating apparatus comprising:
    means for reading record information comprising title information and image information,
    means for recognizing from said record information a predetermined portion of said record information as title information and for extracting said title information.
    first recording means for attaching said title information to said image information and for recording said attached title and image information, and
    second recording means for recording said title information separately from said attached title and image information.

2. An information recording/regenerating apparatus according to claim 1, wherein said title information is positioned at a beginning of said record information, and said reading means reads said record information sequentially from the beginning.

3. An information recording/regenerating apparatus according to claim 1, wherein said title information includes items arranged in a predetermined format, and said reading means reads said items in the order of said format.

4. An information recording/regenerating apparatus according to claim 1, wherein said reading means is constituted by a scanner.

5. An information recording/regenerating apparatus according to claim 1, wherein said recognizing means recognizes dot images of said title information read by said reading means as character recognition and converts said dot images into character coded information.

6. An information recording/regenerating apparatus according to claim 5, wherein said first recording means records said image information and said character coded information in association with each other.

7. An information recording/regenerating apparatus according to claim 1, wherein said first recording means in constituted by an optical disk unit.

8. An information recording/regenerating apparatus according to claim 3, wherein said record information read by said reading means is successively recorded, further comprising first memory means for storing said predetermined portion such that each of said items is assigned to a two-dimensional address in accordance with said predetermined format.

9. An information recording/regenerating apparatus according to claim 6, further comprising second memory means for recording said character coded information supplied from said recognizing means and transmitting said character coded information to said first recording means.

10. An information recording/regenerating apparatus according to claim 9, further comprising second recording means for recording said character coded information supplied from said second. memory means.

11. An information recording/regenerating apparatus according to claim 10, wherein said second recording means is constituted by a magnetic disk unit.

12. An information recording/regenerating apparatus according to claim 8, further comprising coder/decoder means for converting said image information supplied from said first memory means into predetermined codes, and supplying said codes to said first recording means.

13. An information recording apparatus for recording information together with related retrieval information in a recording medium comprising:
    means for reading successively a plurality of sheets each of which includes information to be recorded;
    means for selecting one of sheets from read sheets;
    means for recognizing the information of selected sheet as said retrieval information; and
    means for recording said retrieval information recognized and the information of the remaining sheets into said recording medium.

* * * * *